United States Patent
Kwa et al.

(10) Patent No.: US 9,581,511 B2
(45) Date of Patent: Feb. 28, 2017

(54) MICROELECTROMECHANICAL PRESSURE SENSORS

(71) Applicant: Meggitt (Orange County), Inc., Irvine, CA (US)

(72) Inventors: Tom Kwa, San Jose, CA (US); Leslie Bruce Wilner, Palo Alto, CA (US)

(73) Assignee: MEGGITT (ORANGE COUNTY), INC., Irvine, CA (US)

( * ) Notice: Subject to any disclaimer, the term of this patent is extended or adjusted under 35 U.S.C. 154(b) by 159 days.

(21) Appl. No.: 14/054,715

(22) Filed: Oct. 15, 2013

(65) Prior Publication Data

US 2015/0101413 A1 Apr. 16, 2015

(51) Int. Cl.
| | |
|---|---|
| *G01L 7/08* | (2006.01) |
| *G01L 9/04* | (2006.01) |
| *G01L 9/06* | (2006.01) |
| *G01L 9/00* | (2006.01) |
| *G01P 15/12* | (2006.01) |

(52) U.S. Cl.
CPC ............ *G01L 9/0052* (2013.01); *G01L 9/065* (2013.01); *G01P 15/123* (2013.01)

(58) Field of Classification Search
CPC ..... G01L 9/0052; G01L 9/065; G01L 9/0064; G01L 1/2231; G01L 9/0054; G01L 19/141; G01L 9/0042; G01L 1/18; G01P 1/00; G01P 15/123; G01P 15/0802; G01P 2015/0817; Y10T 29/49103; G01B 7/20
USPC .......................................... 73/715, 720, 727
See application file for complete search history.

(56) References Cited

U.S. PATENT DOCUMENTS

| | | | |
|---|---|---|---|
| 3,351,880 A | 11/1967 | Wilner | |
| 3,520,191 A * | 7/1970 | Pien | F42B 35/00 338/4 |
| 4,065,970 A | 1/1978 | Wilner | |
| 4,093,933 A | 6/1978 | Wilner | |
| 4,498,229 A * | 2/1985 | Wilner | G01L 1/18 257/417 |
| 4,737,473 A | 4/1988 | Wilner | |
| 4,793,194 A | 12/1988 | Wilner | |
| 6,988,412 B1 * | 1/2006 | Wilner | G01L 1/2231 73/754 |
| 2008/0041166 A1 * | 2/2008 | Kurtz | G01B 7/18 73/777 |
| 2008/0084269 A1 * | 4/2008 | Wilner | G01L 1/2293 338/5 |
| 2013/0228022 A1 | 9/2013 | Brown et al. | |

* cited by examiner

*Primary Examiner* — Lisa Caputo
*Assistant Examiner* — Brandi Hopkins
(74) *Attorney, Agent, or Firm* — Hackler Daghighian Martino & Novak

(57) ABSTRACT

A pressure sensitive element is provided. In one embodiment the pressure sensitive element comprises: a diaphragm with a gage side and a back side and a rim surrounding the diaphragm; a pair of inner islands on the gage side of the diaphragm wherein the pair of inner islands are spaced to form a first gap between the pair of inner islands; a first freed gage spanning the first gap; at least one bridge to provide an electrical communication path between the rim and the first freed gage; an outer island on the gage side of the diaphragm wherein the outer island and the rim are spaced to form a second gap; and a second freed gage spanning the second gap.

20 Claims, 9 Drawing Sheets

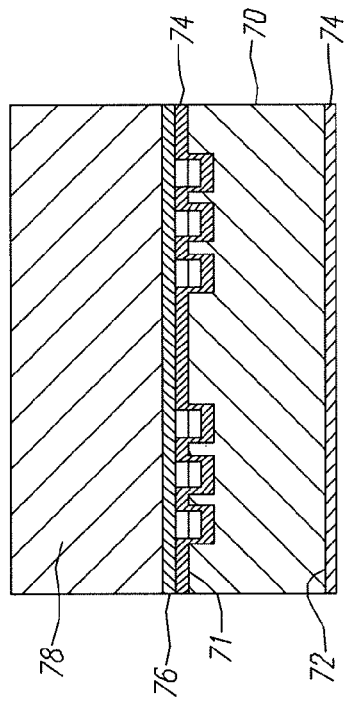
FIG. 5A
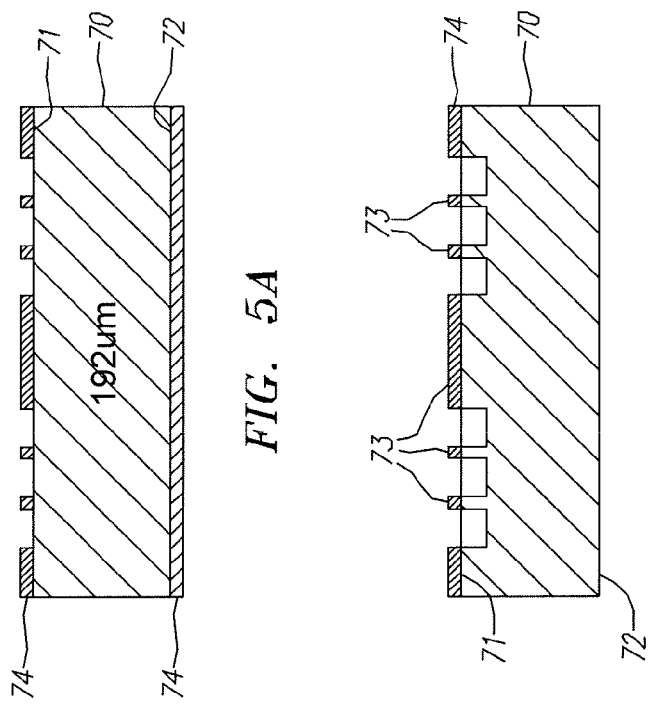
FIG. 5B
FIG. 5C
FIG. 5D
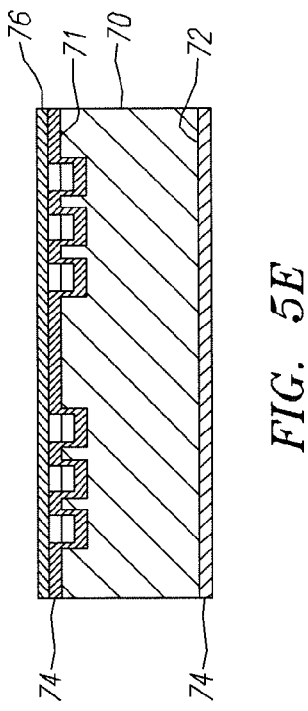
FIG. 5E

MICROELECTROMECHANICAL PRESSURE SENSORS

The present patent document relates to microelectromechanical pressure sensors. More particularly, the present patent document relates to microelectromechanical pressure sensors with a high output.

BACKGROUND

Using a pressure/force sensitive element such as a diaphragm or cantilever in conjunction with a strain sensing element for measuring acceleration, force or pressure is known in the art.

Wire transducers consist of one or more wires stretched and connected between two or more points on a diaphragm. Displacement of the diaphragm stretches the wire elongating it while reducing its cross-sectional area, and accordingly, increasing its resistance to the flow of electrical current in a proportional relationship to the diaphragm displacement. Also known are transducers wherein strain gages are bonded to the diaphragm using adhesives such as epoxy. These strain gages are sometimes made of thin copper alloy foil which is etched to define a gage geometry during manufacture. The foil strain gage is bonded over its entire length to the diaphragm. Here again, deflection of the diaphragm causes a strain in the strain gage element which changes its cross-sectional area and, accordingly, changes its resistance to the flow of electrical current.

Strain gage transducers are generally less expensive and more rugged than the larger wire transducers. Both types of transducers, however, have low gage factors (change in electrical resistance with respect to changes in strain in the gage element) and both produce hysteresis errors affecting accuracy, when the gage is subject to periodic changes in strain.

Improvements are provided by piezoresistive transducers using a single-crystal semiconductor material, such as silicon doped with boron, for a strain gage element. The semiconductor strain gage is embedded in or bonded to the diaphragm and offers the advantage of high gage factor (as much as one hundred times more sensitive than metal strain gages) and small size.

Improvements have also been provided by selectively changing the thickness of the diaphragm so that it will consist of relatively thick islands and a relatively thick rim portion, separated by thin portions. Because the deflection of the diaphragm is primarily along the thin portions, the strain gages can be advantageously mounted across the thin portions in an area of maximum strain to provide increased gage sensitivity.

U.S. Pat. No. 4,093,933 to Wilner teaches a transducer structure having a pressure diaphragm composed of a non-metallic material that has been sculptured by etching to form thick islands and a thick rim interconnected by thin sheet material. The thick portions are separated by the thin flexures in which the strain resulting from the deflections of the diaphragm is concentrated. Piezoresistive semiconductor sensors, similar to the type described in U.S. Pat. No. 3,351,880, are bonded on opposite sides of the thin grooves and electrical connectors are metallurgically bonded to the pads of the sensors so that the sensors may be connected in a Wheatstone bridge type circuit. The sculptured pressure diaphragm is desirable and advantageous because it allows mounting the solid-state strain gage elements across the points of maximum deflection which in essence mechanically amplifies the strain being sensed or measured as the diaphragm responds to forces. This structure is highly desirable because of its increased sensitivity when compared to structures wherein the strain gage element is mounted directly to the diaphragm surface along the entire length of the strain gage element.

Transducers formed from a single crystal of semiconductor material wherein the strain gages are an integral part of the semiconductor diaphragm are known in the art. These transducers offer the advantage of being small in size while having a high gage factor and are easier to manufacture. Also, the integral structure eliminates the need for an adhesive joint between the diaphragm and the strain gage. The adhesive joint is a disadvantage because it is not as stable as the remainder of the crystal structure and there can be relative movement, or creep, between the portions joined by the adhesive. However, these transducers, theoretically, lack the sensitivity of transducers with a sculptured diaphragm having piezoresistive semiconductors secured across slots in the diaphragm.

In U.S. Pat. No. 4,498,229, Wilner teaches an improved piezoresistive transducer and method for making same, wherein the gages are defined upon the substrate and subsequently etched from the material of the substrate. In this piezoresistive transducer the gage element is etched free of the substrate at its midportion and is integral with the substrate at its remote end portions. This piezoresistive transducer provides all the advantages of higher sensitivity provided by the sculptured pressure diaphragm and the freed gage structures described above and it also has the advantages of the one piece integral strain gage/diaphragm structures described above.

Although the single-crystal transducer with etch-freed piezoresistive gages has many advantages over previously known and used transducers, these gages are still connected by interconnections or conductors which are etched on the surface of the substrate, but not etch-freed, or by metallic connectors between the various freed gages. Interconnections etched into the substrate act as structural members stiffening the diaphragm and undesirably reducing its sensitivity to outside forces. In the alternative, the use of metallic connectors between the etch-freed gages introduces undesirable thermal expansion variations between the interconnections and the remainder of the transducer structure and the above-mentioned mechanical hysteresis problems inherent with the metallic structure.

Although the prior art discloses single-crystal piezoresistive transducers having etch-freed gages, there is still a need for a simple, straightforward, reliable, easily fabricated single-crystal semiconductor pressure sensitive element having at least one etch-freed piezoresistive strain gage and at least one etch-freed conductor wherein the strain gage, the conductor and the element are all formed of the same silicon crystal substrate.

In U.S. Pat. No. 4,737,473, Wilner teaches using a strain gage spaced apart from a hinged portion and separated or freed therefrom by grooves within a substantially planar substrate. However, such a substrate is not designed to detect changes in pressure.

SUMMARY OF THE EMBODIMENTS

In view of the foregoing, an object according to one aspect of the present patent document is to provide a microelectromechanical system (MEMS) for detecting pressure. Preferably the methods and apparatuses address, or at least ameliorate one or more of the problems described above. To this end, a pressure sensitive element is provided.

In one embodiment the pressure sensitive element comprises: a diaphragm with a gage side and a back side; a rim surrounding the diaphragm; a pair of inner islands on the gage side of the diaphragm wherein the pair of inner islands are spaced to form a first gap between the pair of inner islands; a first freed gage spanning the first gap; at least one bridge to provide an electrical communication path between the rim and the first freed gage; a first outer island on the gage side of the diaphragm wherein the first outer island and the rim are spaced to form a second gap; and a second freed gage spanning the second gap.

In preferred embodiments of the pressure sensitive element, the first gap is formed over the center of the diaphragm. However, in other embodiments it may be formed in other locations of the diaphragm.

In some embodiments, the pressure sensitive element further comprises a third free gage spanning the first gap. In such embodiments, the pressure sensitive element may further comprise a second bridge to provide an electrical communication path between the rim and the third freed gage.

In yet other embodiments, the pressure sensitive element further comprises a second outer island on the gage side of the diaphragm wherein the second outer island and the rim are spaced to form a third gap and a fourth freed gage spans the third gap.

In some embodiments of the pressure sensitive element, the first freed gage and the second free gage form two arms of an electrical half bridge. In yet other embodiments, the first freed gage, second free gage, third freed gage and fourth freed gage form four arms of an electrical bridge. In some embodiments with at least four freed gages, the first freed gage and the second freed gage provide a differential output with respect to the third freed gage and the fourth freed gage.

In another aspect of the present patent document, a pressure sensitive element is provided. The pressure sensitive element comprises: an outer rim; a diaphragm spanning an interior of the rim and recessed from a top of the rim and a bottom of the rim; a pair of inner islands formed on a top of the diaphragm wherein the pair of inner islands are spaced to form a first gap in a center of the diaphragm between the pair of inner islands; a first freed gage spanning the first gap; at least one bridge to provide an electrical communication path between the rim and the first freed gage; a first outer island on the top side of the diaphragm wherein the first outer island and the rim are spaced to form a second gap; and a second freed gage spanning the second gap.

In some embodiments, a third free gage spanning the first gap is also provided. In some embodiments with a third freed gage a second bridge to provide an electrical communication path between the rim and the third freed gage is provided.

In yet other embodiments, the pressure sensitive element further comprising a second outer island on the top of the diaphragm wherein the second outer island and the rim are spaced to form a third gap and a fourth freed gage spans the third gap.

In another aspect of the present patent document, a process for producing a pressure sensitive element is provided. The process comprises the steps of: etching a gage side of a substrate to create a rim, a plurality of inner islands separated by a first gap, at least one bridge connecting one of the inner islands to the rim and an outer island separated from the rim by a second gap; bonding a highly conductive layer to the top of the gage surface; etching a back side of the substrate to form a diaphragm; and etching the highly conductive layer to form a first freed gage over the first gap electrically connected to the rim over a first bridge and a second freed gage over the second gap.

In some embodiments, the step of etching the highly conductive layer further forms a third freed gage over the first gap wherein the third freed gage is electrically connected to the rim over a second bridge.

In yet other embodiments, the step of etching a gage side further creates a second outer island separated from the rim by a third gap and the step of etching the highly conductive layer further forms a fourth freed gage over the third gap.

As described more fully below, the apparatus and methods of the embodiments of the pressure sensitive elements help solve or at least ameliorate problems with prior sensors. Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed invention.

BRIEF DESCRIPTION OF THE DRAWINGS

FIG. 5A illustrates one embodiment of a pressure sensitive element after the oxide definition process step.

FIG. 5B illustrates one embodiment of a pressure sensitive element after the island formation process step.

FIG. 5C illustrates one embodiment of a pressure sensitive element after the second oxidation process step.

FIG. 5D illustrates one embodiment of a pressure sensitive element after the highly conductive layer has been oxide bonded to the top of the gage side of the pressure sensitive element.

FIG. 5E illustrates an embodiment of a pressure sensitive element with the handle layer removed leaving only the highly conductive layer oxide bonded to the top of the gage side of the element.

DETAILED DESCRIPTION OF THE EMBODIMENTS

As used herein, the term "freed gage" means any electrical conductor that spans a gap without any support along the span. A "freed gage" as used herein, is meant to include those gages only supported at their ends.

Figure 1A:
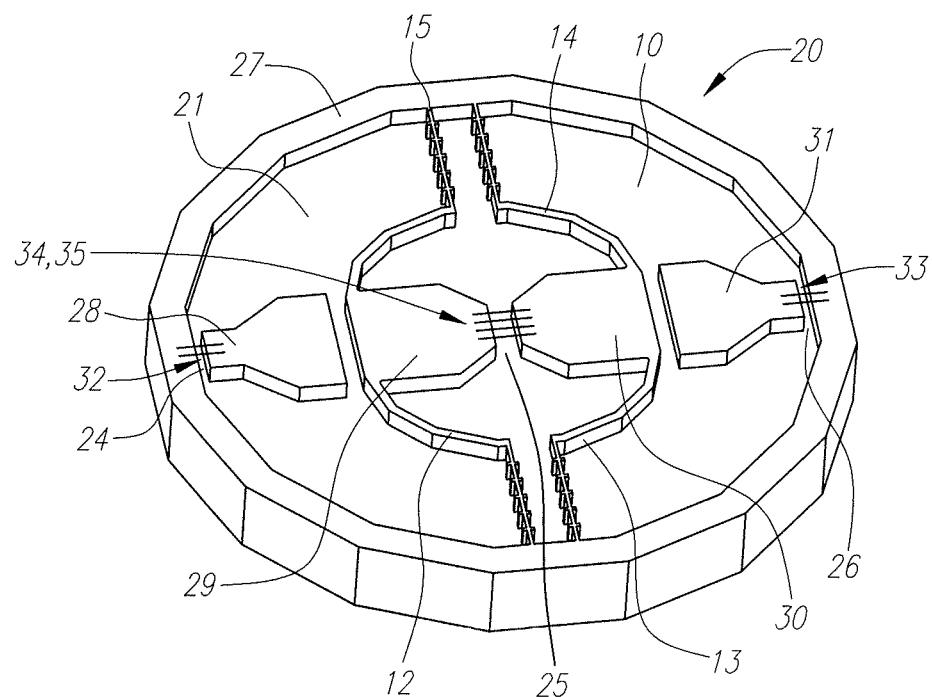
FIG. 1A illustrates an isometric view of a gage side of a pressure sensitive element.
Figure 1B:
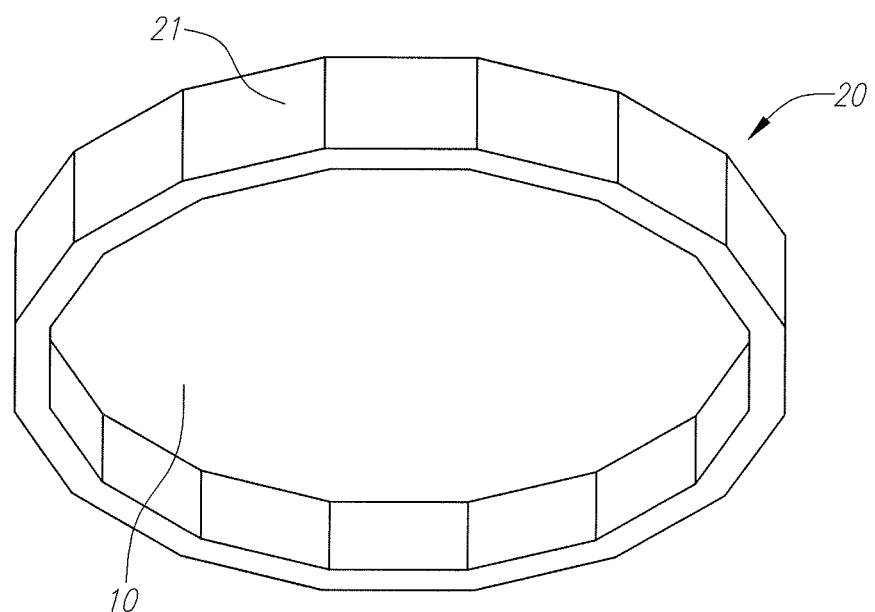
FIG. 1B illustrates an isometric view of the opposite side (back side) of the pressure sensitive element of FIG. 1A.

FIG. 1A illustrates an isometric view of a gage side of a pressure sensitive element 20. The gage side of the pressure sensitive element 20 shown in FIG. 1A may be referred to as the sensing side or top side. FIG. 1B illustrates an isometric view of the opposite side (back side) of the pressure sensitive element 20 of FIG. 1A. In a preferred embodiment, the pressure sensitive element is formed from a substrate 21 comprised of piezoresistive semi-conductive material such as N-type silicon.

In a preferred embodiment, pressure sensitive element 20 includes diaphragm 10, islands 28, 29, 30 and 31, rim 27 and a number of freed strain sensing gages 32, 33, 34 and 35. The strain sensing gages 32, 33, 34 and 35 span gaps 24, 25 and 26 over the diaphragm 10. When in use, the back side of the diaphragm 10 is exposed to a pressure load. The pressure difference between the gage side (i.e., the sensing side or the top side) and the opposite side (i.e., the pressure side or back side) causes the diaphragm 10 to flex. When, for example, a positive pressure is applied to the pressure side, the gap span 25 between the two inner islands 29 and 30 will increase causing the strain gages 34 and 35 to increase in resistance, while the gap spans 24 and 26 between the peripheral rim 27 and the two outer islands 28 and 31 will decrease causing the strain gages 32 and 33 to decrease in resistance. In practice, the changes in resistance may be measured using a Wheatstone bridge or other method for measuring resistance including various other electrical bridge designs.

In a preferred embodiment, the gage side of substrate 21 is formed by removing material from the surface of substrate 21 such as to leave a plurality of bosses or islands. In the embodiment shown in FIG. 1A, the gage side of substrate 21 has a pair of outer islands 28 and 31 and a pair of inner islands 29 and 30. In other embodiments, more or less islands may be formed. The islands are formed by removing the material around the islands.

Substrate 21 further includes a peripheral rim portion 27. In a preferred embodiment, the rim portion is rigid. As may be seen in FIG. 1A, inner islands 29 and 30 are connected to the rim 27 by bridges 12-15. In a preferred embodiment, some of the islands may be connected to the rim by the strain gages such as the outer islands 28 and 31, and some of the islands may be connected to the rim via bridges such as the inner islands 29 and 30. In the embodiment shown in FIG. 1A, all four islands are electrically connected to the rim portion 27. In other embodiments, more islands or fewer islands may be electrically connected to the rim portion 27. Generally speaking, inner islands will need to be electrically connected to the rim 27 by bridges while outer islands may be electrically connected directly to the rim by gages.

In addition to the material that is removed from the substrate 21 from the gage side, all or substantially all of the material is removed from a large area of the back side of the substrate 21 such that a diaphragm 10 is formed. In the preferred embodiment shown in FIG. 1B, a large area has been removed from the center of the back side of the substrate 21. The removal of material on the back side of the substrate 21 should coincide with the removal of material on the front side of substrate 21 such that a diaphragm 10 is formed. As may be seen in FIGS. 1A and 1B, all of the substrate material, except that which forms the islands, bridges and rim has been removed from the gage side, and all of the material except that which forms the rim, has been removed from the back side. The depth and the alignment of the material removal on each side are such that a diaphragm 10 is formed between the two sides.

The diaphragm 10 in the embodiment shown in FIGS. 1A and 1B is in the shape of a hexadecagon. However, other shapes may be used. For example, the diaphragm 10 may be an octagon, decagon or be any shape having any number of sides. In some embodiments, the diaphragm 10 may be circular. In a preferred embodiment, the diaphragm 10 is shaped to match the shape of the outside of substrate 21.

The diaphragm 10 in the embodiment shown in FIGS. 1A and 1B is also centered in the middle of the substrate 21. However, in other embodiments, it may not be centered. For example, the pressure sensitive element 20 and corresponding diaphragm 10 may be a portion of a larger MEMS. In such cases, the diaphragm 10 may be located off-center.

The islands formed in the gage side of the substrate 21 are strategically positioned. In a preferred embodiment at least two of the islands (inner islands 29 and 30) are proximately positioned and shaped such that they form a channel, gap or groove 25 between the two islands. In the embodiment shown in FIG. 1A, the inner islands 29 and 30 form channel 25. In a preferred embodiment, the two islands that form channel 25 are located so that channel 25 runs over the center of diaphragm 10. An inner strain gage spans the channel 25. In the embodiment shown in FIG. 1A two inner strain gages 34 and 35 span the channel 25. In a preferred embodiment, the channel 25 is located near the center of the diaphragm 10 such that when the diaphragm 10 flexes, a maximum increase in gap span is experienced by the inner strain gages 34 and 35.

In a preferred embodiment, at least one island is located in a manner such that a second groove, gap, or channel 24 is formed between the island and the rim 27. As shown in FIG. 1A, the outer island 28 forms channel 24 between itself and the rim 27. An outer strain gage 32 spans the channel 24 between the outer island 28 and the rim 27. The location of the island is such that the channel 24 is formed close to the outside of the diaphragm 10. Accordingly, deflection of the diaphragm 10 will cause a maximum decrease in gap span and the resulting strain in gage 32 will be in the opposite direction of that in strain gages 34 and 35.

In the embodiment shown in FIG. 1A, a third groove, gap, or channel 26 is formed between outer island 31 and the rim 27. The third gap 26 is formed in a similar manner to the second gap 24. In a preferred embodiment, the four gages 32, 33, 34 and 35 are linearly arranged along a diameter of the diaphragm 10. However, in other embodiments, other configurations may be used. Linearity of the gages is not as important as having at least one gage near an area of gap span increase (inner location) with at least one other gage near an area of gap span decrease (outer location). By placing gages 34 and 35 near the center of the diaphragm 10 and the other two gages 32 and 33 near the very edge of the diaphragm, good sensitivity of strain sensing device 20 may be achieved.

In a preferred embodiment, the design of the islands and bridges is symmetric about two orthogonal diameters of the diaphragm 10. Arranging the gages linearly along a diameter of the diaphragm reduces any inconsistencies due to a lack of symmetry in a second axis and is preferred.

Although the embodiment shown in FIG. 1A shows four gages 32, 33, 34 and 35, in other embodiments additional gages or additional islands and gages may be used. The outputs of the additional gages may be averaged with existing gages to get a more accurate reading. In a preferred embodiment including more than the minimum number of gages, gages positioned the same distance from the center of the diaphragm may be averaged or used to produce a differential output to increase sensitivity and/or accuracy.

In yet other embodiments, fewer gages and/or fewer islands and gages may be used. As will be explained in more detail below, the four gages in the embodiment shown in FIG. 1A are preferably configured as the four arms of an open or closed 4-arm bridge, providing a differential output with twice the sensitivity of a half bridge. However, a single inner gage and a single outer gage may be configured in a half bridge without departing from the scope of the present patent document.

The gages 32, 33, 34 and 35 are spaced apart from the diaphragm 10 and separated or freed therefrom by channels 24, 25 and 26. In a preferred embodiment, the gages may be doped with boron to form P-type material. The intersection of the P-type material and the N-type substrate 21 forms an P-N junction.

As will be explained in more detail hereinafter, in a preferred embodiment the strain gages are all unitary members derived from the same silicon material.

Although not shown in FIGS. 1A or 1B, the rim portion 27 may include metalized areas to provide a metallic surface for connecting the pressure sensitive element 20 to outside circuitry. In the embodiment shown in FIGS. 1A and 1B, gages 32, 33, 34 and 35 form four legs of a Wheatstone bridge. In other embodiments with fewer gages, the remainder of the bridge may be located or connected through metalized areas on the rim 27. Moreover, associated circuitry may also be attached to the metalized surfaces.

As may be seen in FIG. 1A, embodiments with islands that form channels between the islands and the rim 27 allow the strain gages that span those channels to have direct contact with the rim 27. This may be seen in FIG. 1A with the outer islands 28 and 31, channels 24 and 26, and gages 32 and 33 respectively. However, in order to form a channel and place a strain gage near the center of diaphragm 10, bridges may need to be constructed to provide electrical communication between the rim 27 and the strain gages 34 and 35 in the center of the diaphragm 10. As may be seen in FIG. 1A, bridges 12, 13, 14, and 15 provide a path for electrical communication between the strain gage 31 and the rim 27. In embodiments with a single strain gage near the center, fewer bridges may be used. In embodiments, with more strain gages not directly in electrical communication with the rim 27, more bridges may be needed.

Although the islands and bridges formed on the gage side of substrate 21 may be of any size or shape, a preferred embodiment of pressure sensitive element 20 removes a substantial amount of material from the gage side of substrate 21. In a preferred embodiment between 50% and 90% of the material is removed from the gage side. In an even more preferred embodiment, the material removal from the gage side of the substrate 21 is optimized to allow the largest gap span dimension changes.

In a preferred embodiment, the pressure sensitive element 20 may be made extremely small in size having an approximate desirable diameter of 1500 um (0.059"). Of course embodiments of other sizes may be made without departing from the scope of the present patent document. In a preferred embodiment, the thickness is within the range of about 0.003 inches (0.076 mm) and 0.015 inches (0.381 mm) and the thickness of the diaphragm is within the range of 0.0003 inches (7.62 um) and 0.0010 inches (25.4 um). In a more preferred embodiment, the thickness of the diaphragm is around 0.0006 inches (16 um). The gages are so small that they are difficult to see with the unaided eye. A representative size for an etch-freed strain gage is about 30 microns long, 6 microns wide and 1.5 microns thick.

Although the instant embodiment is described having four freed strain gages, it is within the purview of the present invention to include embodiments having one or more freed strain gages and one or more gages that are not freed.

Figure 2A:
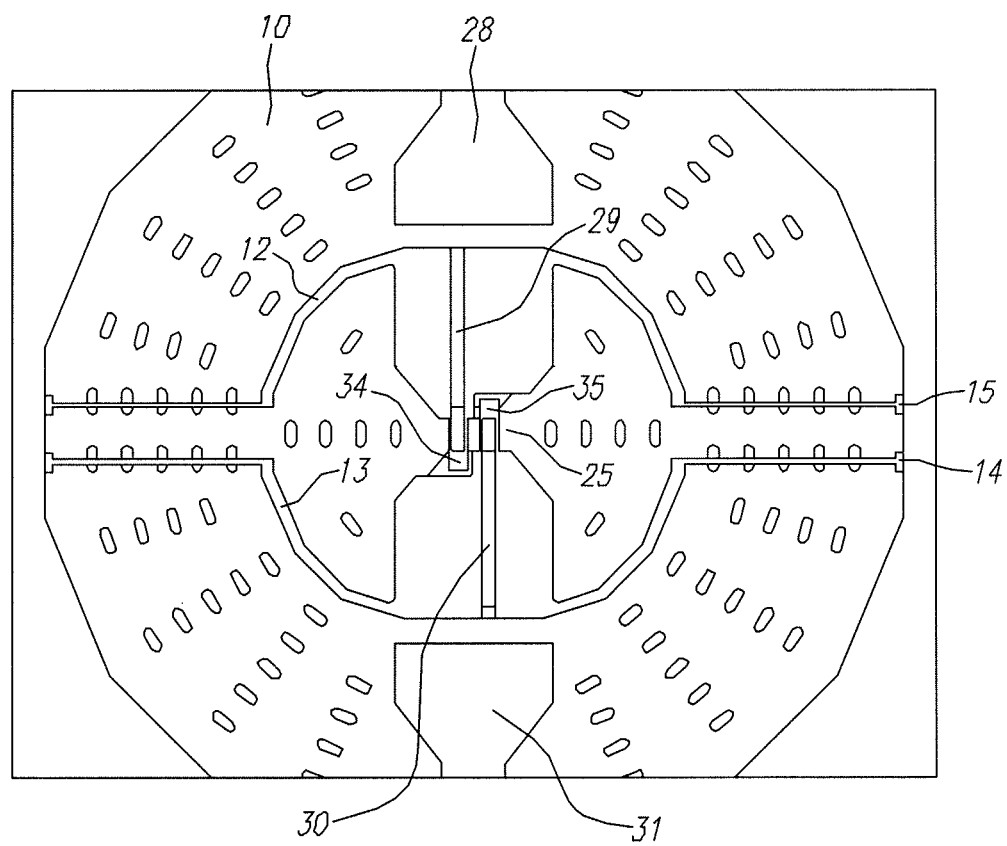
FIG. 2A illustrates a close-up view of one embodiment of inner freed gage bridges over a recessed diaphragm.

FIG. 2A illustrates a close-up top view of one embodiment of the inner freed gage bridges 34 and 35 over the recessed diaphragm 10. As may be seen in FIG. 2A, gage 35 is formed to originate from inner island 30 and electrically connected to the rim 27 by bridges 13 and 14. As may also be seen in FIG. 2A, gage 34 is formed to originate from inner island 29 and electrically connected to the rim 27 by bridges 12 and 15. The numerous black spots over diaphragm 10 represent pillars that in a preferred embodiment are formed to support the conductive layer during the formation process. These pillars are tooling and do not add to the functional aspect of the embodiments.

Figure 2B:
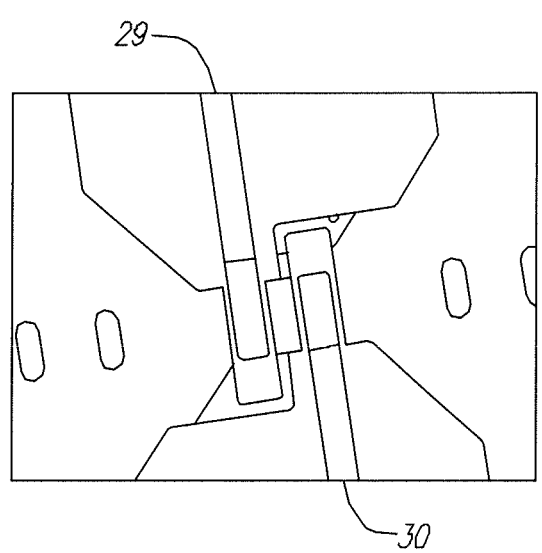
FIG. 2B illustrates an even closer top view of the inner freed gage bridges of FIG. 2A.

FIG. 2B illustrates an even closer top view of the inner freed gage bridges 34 and 35 of FIG. 2A. Each gage, 34 and 35 is physically connected to both inner islands 29 and 30.

Figure 3A:
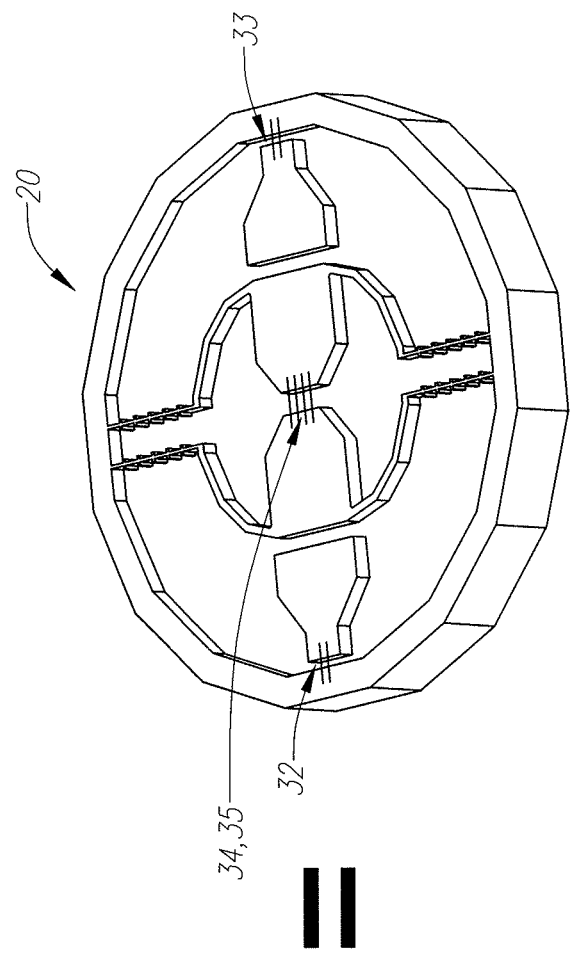
FIG. 3A illustrates an electrical schematic of one embodiment of a pressure sensitive system with a closed-bridge design.
Figure 3A:
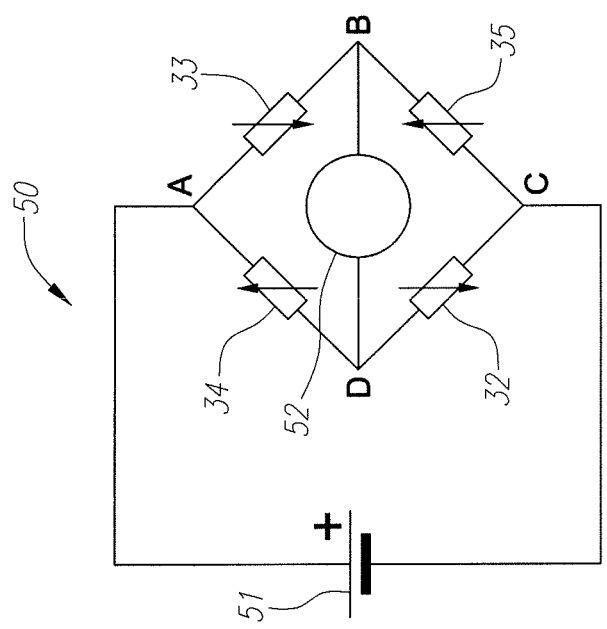

Referring to FIG. 3A, the instant embodiment comprises a piezoresistive bridge circuit wherein the four gages 32, 33, 34 and 35 are active arms of the bridge circuit. FIG. 3A illustrates an electrical schematic of one embodiment of the pressure sensitive system 50 with a closed-bridge design. In a preferred embodiment, the four arms of the bridge circuit are configured as a closed four-arm bridge, providing a differential output with twice the sensitivity of a half bridge. The remainder of the bridge includes a source 51 of, for example, a direct current signal, and a recorder system 52, such as a conventional amplifying system and recording oscillograph. Although the embodiment shown in FIG. 3A illustrates a four-arm closed-bridge design, other bridge circuit designs may be used.

Figure 3B:
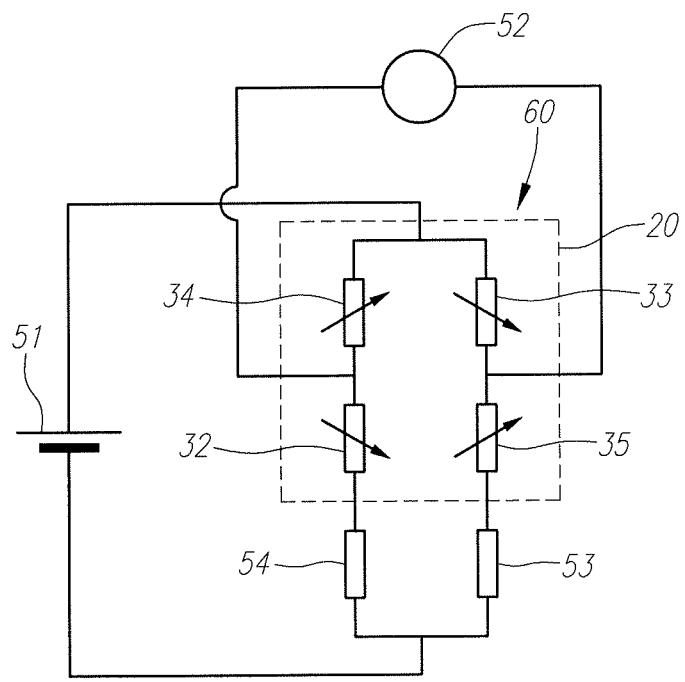
FIG. 3B illustrates an electrical schematic of one embodiment of a pressure sensitive system with an open-bridge design.

As just one example, the bridge circuit could be a four-arm open-bridge design. FIG. 3B illustrates one embodiment of a four-arm open-bridge configuration 60. In an open configuration, the bottom common connection of the two legs are separated/open providing the ability to balance and/or temperature compensate the output of the bridge. As may be seen in FIG. 3B, additional resistors 53 and 54 may be attached to the open ends of the bridge. The additional resistors 53 and 54 may provide compensation for an environmental or other effect experienced by the bridge circuit. Compensation resistors 53 and 54 may compensate for thermal changes or other dynamically changing environmental effects. In a preferred embodiment, the resistors are designed to automatically compensate for thermal effects. In other embodiments, the resistors 53 and 54 may be adjusted/selected to allow compensation/nulling of the bridge's output.

As may be seen in FIG. 3B, compensation resistors 53 and 54 are not located on the pressure sensitive element 20. In a preferred embodiment, compensation resistors 53 and 54 are located in circuitry external to the pressure sensitive element 20. In other embodiments, compensations resistors 53 and 54 may be part of a packaged sensor product but are not necessarily on the pressure sensitive element 20. In a preferred embodiment, the recording system and/or voltage meter 52 are/is not integral to the structure of the pressure sensitive element 20. In a preferred embodiment, the voltage meter 52 is part of the surrounding circuitry and/or part of the circuitry of the overall package but not on the pressure sensitive element 20.

Figure 3C:
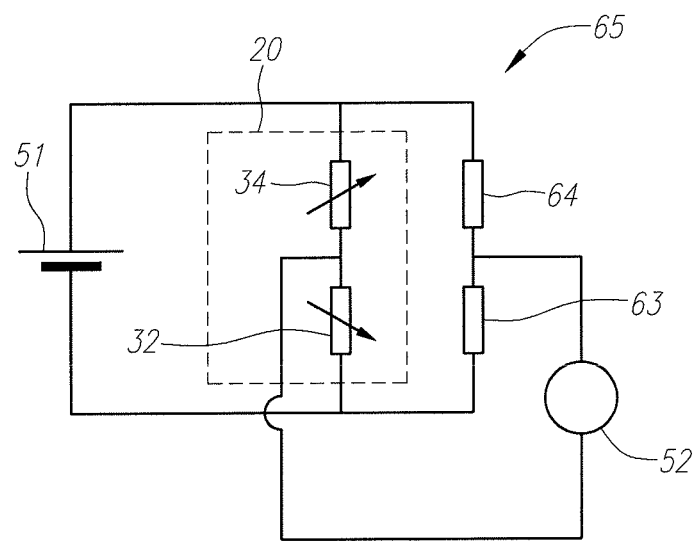
FIG. 3C illustrates an electrical schematic of one embodiment of a pressure sensitive system with a half-bridge design.

As described above, in other embodiments fewer gages may be incorporated in the pressures sensitive element 20 such that only a half-bridge is created. In such embodiments, the remainder of the bridge may be provided by externally supplied resistors. FIG. 3C illustrates an electrical schematic of one embodiment of a pressure sensitive system including a half-bridge design. Resistors 63 and 64 are technically part of the bridge but are not part of the pressure sensitive element 20. Resistors 63 and 64 are external resistors.

In a preferred embodiment of the half-bridge design, the pressure sensitive element 20 includes a gage 34 across two inner islands and a gage 32 between the rim and an outer island. In other half-bridge embodiments, other configurations may be used.

Figure 4:
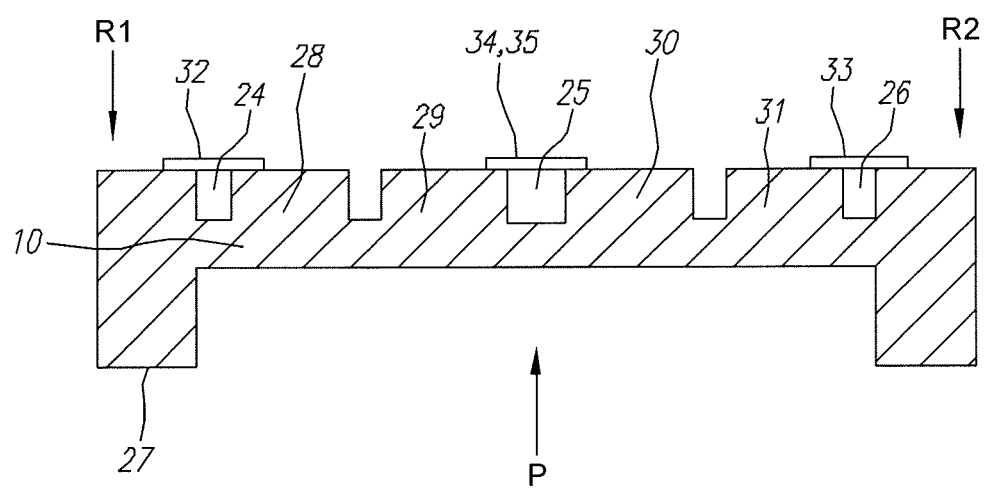
FIG. 4 represents a cross-sectional view of one embodiment of a pressure sensitive system.

In use, the rim 27 of the pressure sensitive element may be sealed to a pressure source so that a pressure differential is applied across the element, in the direction of force P, and resisted by forces R1 and R2, as best illustrated in FIG. 4. The point of greatest deflection will be in the center diaphragm 10 under the channel 25 between inner islands 29 and 30. The pressure differential will cause the diaphragm 10 to push up and widen the gap 25 between the inner islands 29 and 30. Accordingly, gages 34 and 35, extending between the inner islands 29 and 30 over channel 25 will be in tension. The gaps between the rim 27 and the outer islands 28 and 31 will be narrowed as the outer islands press up against the fixed rim placing gages 32 and 33 in compression.

When current is flowing through the bridge the resistance of gages 34 and 35 will increase because they are stressed in tension and the resistance of gages 32 and 33 will decrease because they are stressed in compression. The change in resistance is related to the deflection within the element and accordingly related to the pressure P being measured so that the pressure experienced by the element can be measured and recorded.

It may be seen that the embodiments described herein provide a pressure sensitive element for use in a system for converting pressure differences into variations in electrical characteristics, which may be used to measure pressure differences. The embodiments described herein provide freed gages, which are spaced from the diaphragm 10 to maximize sensitivity to bending.

Although the embodiments described above include freed gages, unsupported in their midportions, wherein the gages are an integral part of the underlying piezoresistive material of the element, in other embodiments the freed gages may be etch freed gages.

Turning now to FIGS. 5A-5G, a sequence of steps is illustrated for producing a piezoresistive pressure sensitive element having freed or suspended gages. A first step in the process is to select a planar N-type silicon crystal substrate 21 (element 70) with oxide layer 74. The plane of said element having a gage side 71 and an opposed back side 72. Element 70 is desirably within the range of between about 0.003 inch and 0.015 inch (0.076 mm and 0.381 mm) and preferably within the range of between about 0.0073 inch and 0.0077 inch (0.185 mm and 0.196 mm) thick. In an even more preferred embodiment, the element 70 may be approximately 0.192 mm thick.

In a preferred embodiment, an oxide layer 74 is formed in a first oxide forming step, on both sides of element 70 to a thickness of about 0.5 micron. FIG. 5A illustrates one embodiment of a pressure sensitive element after the oxide forming and patterning process steps. In other embodiments, the oxide layer 74 may only be formed on the gage side 71 of the element 70, while protecting the back side 72, in the first forming step. It is preferred that the oxide layer 74 is formed by oxidizing the surface of the substrate such as in a steam environment. However in other embodiments, the oxide layer 74 may be formed by depositing an oxide on the surface of the substrate.

In a preferred embodiment, coordinating indices (not shown) can be established on the element for indexing both directions, so that subsequent operations on the element, as will be explained in more detail hereinafter, will be performed along the proper direction with respect to the grain of the element. The coordinating index marks may be formed using a photolithographic process wherein indexing apertures (not shown) are opened in the oxide layer.

As illustrated in FIG. 5A, the oxide layer may be patterned on the gage side 71 to establish the position of the islands and bridges. In other embodiments, the entire gage side 71 may be covered by the oxidation layer 74 and then selectively removed. When selectively removing the oxide layer 74, the islands and bridges are defined by the areas that remain with the oxide layer. In a process step where the oxide layer is removed, an etching pattern is opened on the gage side to define the islands and bridges to be formed in the element. This defining step may be performed using a photolithographic process wherein portions of oxide layer 74 are removed to define the groove, preferably in a process using buffered hydrofluoric acid. In some embodiments, the oxide layer may be stripped from the back side of the element. It should be noted that if an oxide layer is not formed on the back side of the element, as eluded to above, it will obviously not be necessary to provide for the stripping of an oxide layer.

Once the oxide layer step is completed, the island formation step may be undertaken. FIG. 5B illustrates one embodiment of a pressure sensitive element after the island formation process step. In the island formation step, the islands may be formed by etching away the silicon element 70 in the areas not covered by the oxide layer 74 on the gage side 71. During the etching procedure, areas protected by oxide do not readily etch and thus, will be automatically protected. Accordingly, as illustrated in FIG. 5B, islands and bridges will be formed in the shapes defined in the previous step. In a preferred embodiment, the etch in the island formation step may be performed using deep reactive-ion etching (DRIE). However, in other embodiments other etching processes maybe used.

In a preferred embodiment, a 50 micrometer etch is performed. However, in other embodiments, other depths may be used. In a preferred embodiment, the depth of the island etch is coordinated with the depth of the back side etch in a later process step to control the thickness of the diaphragm formed. Preferably, the etching procedure is performed to a depth which will produce a residual thickness of the diaphragm of about 0.0001 inch to 0.003 inch depending on the function the transducer will perform. This etching step can be performed in generally about four hours, depending on the process parameters. It is desirable to control the etching step so that the depth is controlled. This control is desirable because the thickness of the diaphragm will determine the relative stiffness of the element which must be matched to the anticipated pressures and/or forces that will be experienced by the element in actual use. For example, an element that is not stiff enough may be damaged in use, and an element that is too stiff may lack the sensitivity for the intended use. One way to control the depth of the etch, and therefore the diaphragm thickness, is to control the process and to discontinue the etching when the desired thickness is achieved. If the etch does not go to the right depth, it may be compensated for by modifying the depth of the back side etch, which determines the ultimate thickness of the diaphragm in a later step.

Once the island formation step is completed, the second oxidation step may be undertaken. FIG. 5C illustrates one embodiment of a pressure sensitive element after the second oxidation process step. In the second oxidation step, all areas on the gage side of the silicon without an oxide layer due to the previous etching step are deposited with oxide. The back side 72 of the element 70 also receives an oxide layer. In a preferred embodiment, the oxide layer is formed to a thickness of about 0.5 micron. In other embodiments, other oxide layer thicknesses may be used.

Once the second oxidation step is completed, a highly conductive layer 76 is oxide bonded to the top of the gage side of the element. FIG. 5D illustrates one embodiment of a pressure sensitive element after the highly conductive layer 76 has been oxide bonded to the top of the gage side 71 of the pressure sensitive element. In a preferred embodiment, the highly conducted layer 76 is attached to or embedded in a much thicker wafer or handling layer 78. The handling layer 78 allows handling of the highly conductive layer 76 and will be removed in the next process step.

In embodiments where the highly conductive layer 76 is oxide bonded with a handling layer 78, the handling layer may subsequently be removed once the highly conductive layer is bonded. FIG. 5E illustrates an embodiment of a pressure sensitive element with the handling layer 78 removed leaving only the highly conductive layer 76 oxide bonded to the top of the gage side 71 of the element. The handling layer 78 may be removed by EDP etching. EDP etching involves using an aqueous solution of ethylene diamine and pyrocatechol.

Figure 5F:
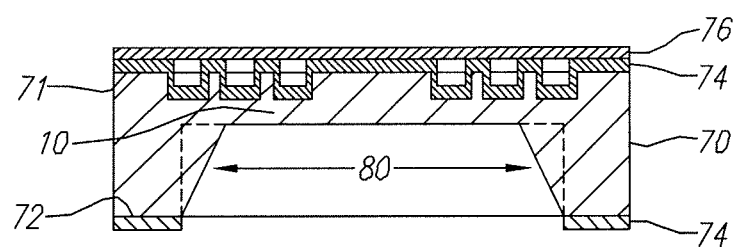
FIG. 5F illustrates one embodiment of a pressure sensitive element after the diaphragm forming step.

Once the handling layer 78 is removed, the diaphragm forming step may be performed. FIG. 5F illustrates one embodiment of a pressure sensitive element after the diaphragm forming step. The diaphragm forming step is performed by etching a large volume 80 into the back side 72 of the element. In a preferred embodiment, the depth of the etch is controlled such that the diaphragm 10 obtains its desired thickness. In a preferred embodiment, a recess etch of 130 um is performed. Other etch depths may be used and preferably are coordinated with the etch depth of the island formation step to obtain the desired diaphragm thickness. In a preferred embodiment, the diameter of the recess depth defines the diameter of the diaphragm 10 and is also coordinated with the island formation etching step.

The island formation etching may be performed in any number of ways. In a preferred embodiment, a Potassium Hydroxide (KOH) etching process may be used. As shown in FIG. 5F, KOH etching produces chamfered edges to the recess. In another preferred embodiment, DRIE etching may be used instead of KOH etching. DRIE etching will produce straight sides and square corners in the recessed etch (shown in dashed lines). Either process may be used and in yet other embodiments, other etching processes may be used.

Figure 5G:
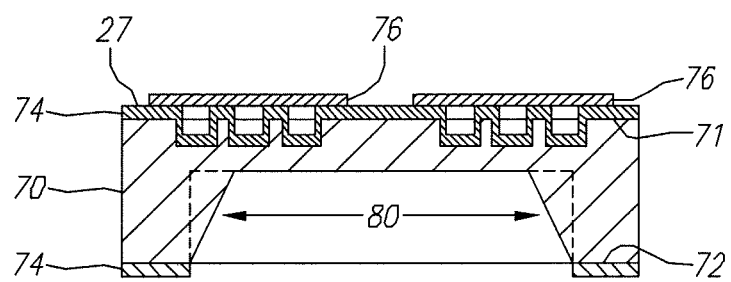
FIG. 5G illustrates one embodiment of a pressure sensitive element after the gage definition step.

Once the diaphragm forming step is complete, the gage etch step may be performed. FIG. 5G shows an embodiment of a pressure sensitive element after the gage etch step has been performed. The gage etch step removes the unwanted conductive layer 76 to produce the freed gages and other conductive elements of the pressure sensitive element, such as, for example, the conductive path from the inner freed gages to the rim over the bridges. In a preferred embodiment, the gage etch step is done using reactive-ion etching. In other embodiments, other etching processes may be used.

Additional steps may be performed to smooth the surface of the recessed diaphragm 10. In a preferred embodiment an EDP smoothing etch may be done to smooth the surface of the diaphragm. In yet other embodiments, an IPA KOH smoothing etch may be performed to smooth the surface of the diaphragm 10.

At this point in the process a pressure sensitive element having etch-freed gages and a diaphragm has been formed. The remaining steps in the process are performed to form a surface which is adapted to the electrical communication with exterior circuits, and to cut the element to a proper size.

Figure 6:
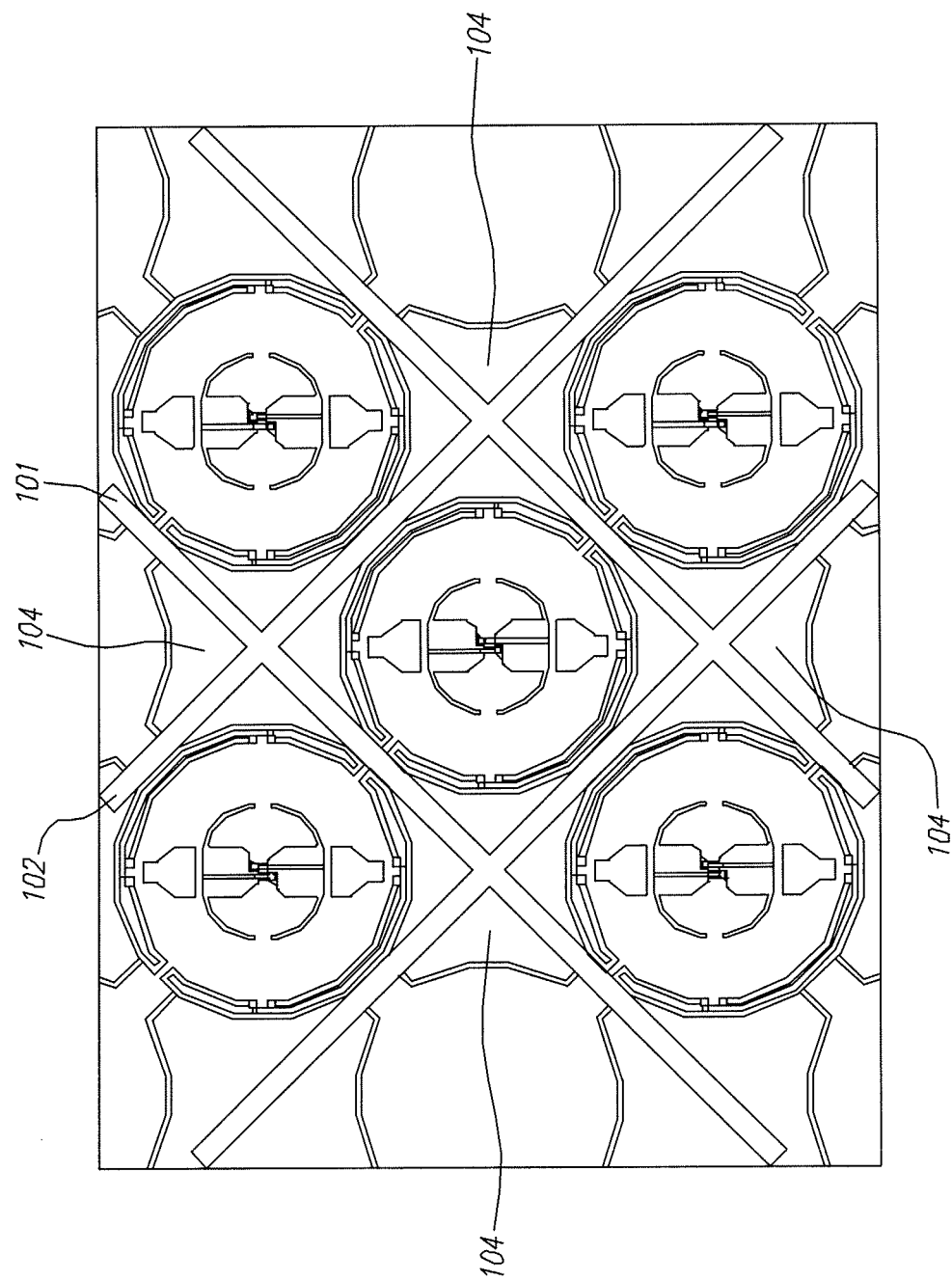
FIG. 6 illustrates a plurality of pressure sensitive elements patterned on a large substrate and the preferred dicing pattern associated therewith.
Figure 7:
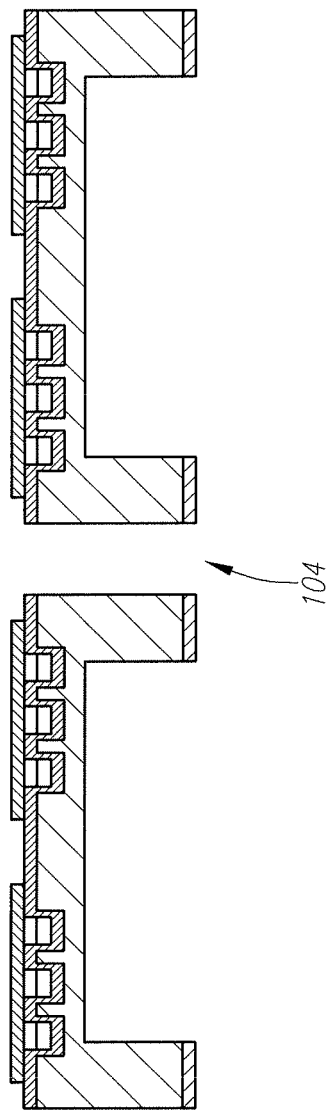
FIG. 7 further illustrates the location of the through holes that may be used for die singulation.

Although the processes described hereinabove recite the steps to produce one pressure sensitive element, these steps are also applicable to a process using a substantially larger substrate so that a plurality of elements may be formed thereon. FIG. 6 illustrates a plurality of pressure sensitive elements patterned on a large substrate. When multiple pressure sensitive elements are formed in a single large substrate, through holes 104 may be needed for die singulation. FIG. 6 illustrates one configuration of through holes 104 that may be used for die singulation. FIG. 7 further illustrates the location of the through holes needed for die singulation 104.

When multiple elements are formed, the final step involves the cutting of the substrate to produce a plurality of defined elements. FIG. 6 illustrates the preferred dicing pattern 101 and 102.

In a preferred embodiment, the element is cut from the substrate using cutting means such as a diamond saw or an ultrasonic impact grinder to produce an element of the exact size desired. It is preferred that the process described hereinabove be used to produce a plurality of elements from one substrate.

Thus, it can be seen that the present invention provides a simple, straightforward, reliable, easily fabricated, pressure sensitive element having a plurality of freed piezoresistive strain gages passing over a diaphragm in the element.

Although the embodiments have been described with reference to preferred configurations and specific examples, it will readily be appreciated by those skilled in the art that many modifications and adaptations of the electronic device with a customizable image and methods therefore described herein are possible without departure from the spirit and scope of the embodiments as claimed hereinafter. Thus, it is to be clearly understood that this description is made only by way of example and not as a limitation on the scope of the embodiments as claimed below.

What is claimed is:
1. A pressure sensitive element comprising:
   a diaphragm with a gage side and a back side;
   a rim surrounding the diaphragm;
   a pair of inner islands on the gage side of the diaphragm wherein the pair of inner islands are spaced to form a first gap between the pair of inner islands and wherein neither island of the pair of inner islands is adjacent to the rim;
   a first freed gage spanning the first gap;
   at least one bridge on the gage side that spans from an island of the pair of inner islands to the rim and is formed by a thicker portion of the diaphragm and provides an electrical communication path between the rim and the first freed gage;

a first outer island on the gage side of the diaphragm wherein the first outer island and the rim are adjacent and are spaced to form a second gap; and a second freed gage spanning the second gap.

2. The pressure sensitive element of claim 1, wherein the first gap is formed over the center of the diaphragm.

3. The pressure sensitive element of claim 1, further comprising a third free gage spanning the first gap.

4. The pressure sensitive element of claim 3, further comprising a second bridge on the gage side that spans from an island of the pair of inner island to the rim and is formed by a thicker portion of the diaphragm and provides an electrical communication path between the rim and the third freed gage.

5. The pressure sensitive element of claim 1, further comprising a second outer island on the gage side of the diaphragm wherein the second outer island and the rim are adjacent and spaced to form a third gap and a fourth freed gage spans the third gap.

6. The pressure sensitive element of claim 5, wherein the first freed gage, second free gage, third freed gage and fourth freed gage form four arms of an electrical bridge.

7. The pressure sensitive element of claim 6, wherein the first freed gage and the second freed gage provide a differential output with respect to the third freed gage and the fourth freed gage.

8. The pressure sensitive element of claim 1, wherein the first freed gage and second free gage form two arms of an electrical half bridge.

9. A pressure sensitive element comprising:

an outer rim;

a diaphragm spanning an interior of the rim and recessed from a top of the rim and a bottom of the rim;

a pair of inner islands formed on a top of the diaphragm wherein the pair of inner islands are spaced to form a first gap in a center of the diaphragm between the pair of inner islands and wherein neither island of the pair of inner islands is adjacent to the rim;

a first freed gage spanning the first gap;

at least one bridge on the gage side that spans from an island of the pair of inner islands to the rim and is formed by a thicker portion of the diaphragm and to provide an electrical communication path between the rim and the first freed gage;

a first outer island on the top side of the diaphragm wherein the first outer island and the rim are adjacent and are spaced to form a second gap; and a second freed gage spanning the second gap.

10. The pressure sensitive element of claim 9, further comprising a third free gage spanning the first gap.

11. The pressure sensitive element of claim 10, further comprising a second bridge on the gage side that spans from an island of the pair of inner islands to the rim and is formed by a thicker portion of the diaphragm and provides an electrical communication path between the rim and the third freed gage.

12. The pressure sensitive element of claim 9, further comprising a second outer island on the top of the diaphragm wherein the second outer island and the rim are adjacent and spaced to form a third gap and a fourth freed gage spans the third gap.

13. The pressure sensitive element of claim 12, wherein the first freed gage, second free gage, third freed gage and fourth freed gage form four arms of an electrical bridge.

14. The pressure sensitive element of claim 13, wherein the first freed gage and the second freed gage provide a differential output with respect to the third freed gage and the fourth freed gage.

15. The pressure sensitive element of claim 9, wherein the first freed gage and second free gage form two arms of an electrical half bridge.

16. A process for producing a pressure sensitive element comprising:

etching down into a gage side of a substrate such that areas that are not etched form a rim, a plurality of inner islands not adjacent to the rim and separated by a first gap, at least one bridge connecting one of the inner islands to the rim and an outer island adjacent to the rim and separated from the rim by a second gap;

bonding a highly conductive layer to the top of the gage surface;

etching a back side of the substrate to form a diaphragm; and etching the highly conductive layer to form a first freed gage over the first gap electrically connected to the rim over a first bridge and a second freed gage over the second gap.

17. The process of claim 16, wherein the etching the highly conductive layer step further forms a third freed gage over the first gap wherein the third freed gage is electrically connected to the rim over a second bridge.

18. The process of claim 17, wherein the etching a gage side step further creates a second outer island adjacent to the rim and separated from the rim by a third gap and the etching the highly conductive layer step further forms a fourth freed gage over the third gap.

19. The process of claim 18, wherein the first freed gage, second freed gage, third freed gage, and fourth freed gage are electrically connected to form an electrical bridge.

20. The process of claim 16, wherein the first freed gage and the second freed gage are electrically connected to form an electrical half-bridge.

* * * * *

UNITED STATES PATENT AND TRADEMARK OFFICE
CERTIFICATE OF CORRECTION

| | | |
|---|---|---|
| PATENT NO. | : 9,581,511 B2 | Page 1 of 1 |
| APPLICATION NO. | : 14/054715 | |
| DATED | : February 28, 2017 | |
| INVENTOR(S) | : Tom Kwa and Leslie Bruce Wilner | |

It is certified that error appears in the above-identified patent and that said Letters Patent is hereby corrected as shown below:

In the Claims

Column 13, Line 9, cancel the text beginning with "4. The pressure sensitive element" to and ending "third freed gage." in Column 13, Line 14, and insert the following claim:

--4. The pressure sensitive element of claim 3, further comprising a second bridge on the gage side that spans from an island of the pair of inner islands to the rim and is formed by a thicker portion of the diaphragm and provides an electrical communication path between the rim and the third freed gage.--

Signed and Sealed this
Tenth Day of April, 2018

Andrei Iancu
*Director of the United States Patent and Trademark Office*